Figure 1:
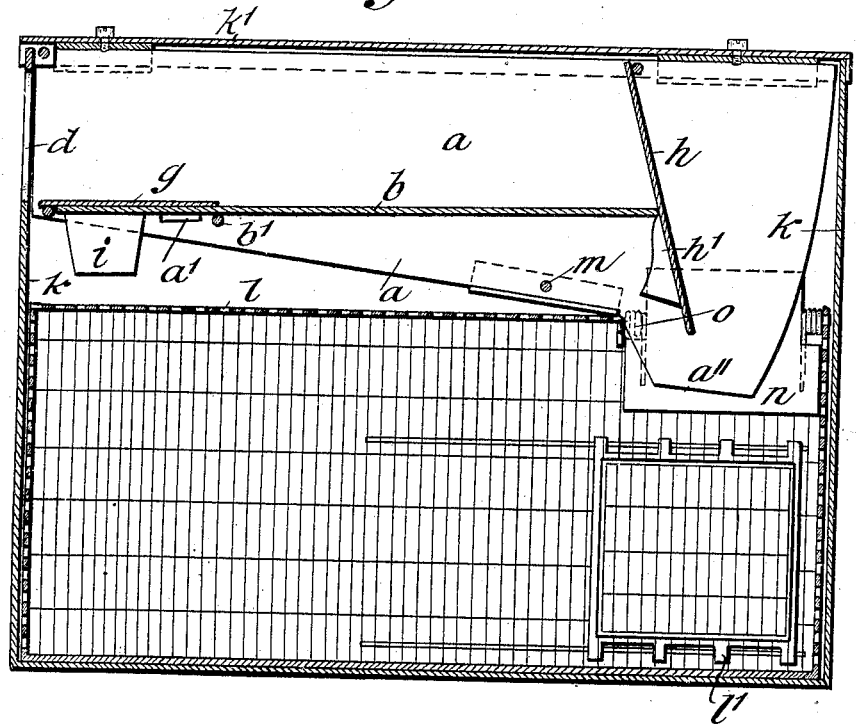

No. 835,874. PATENTED NOV. 13, 1906.
M. J. E. THORER.
ANIMAL TRAP.
APPLICATION FILED AUG. 3, 1906.

3 SHEETS—SHEET 1.

Witnesses
Inventor
Max Julius Emanuel Thorer
by his Attorney

No. 835,874. PATENTED NOV. 13, 1906.
M. J. E. THORER.
ANIMAL TRAP.
APPLICATION FILED AUG. 3, 1906.

3 SHEETS—SHEET 2.

Witnesses
A J Haddan
S. Ford

Inventor
Max Julius Emanuel Thorer
by his Attorney R Haddan

No. 835,874. PATENTED NOV. 13, 1906.
M. J. E. THORER.
ANIMAL TRAP.
APPLICATION FILED AUG. 3, 1906.

3 SHEETS—SHEET 3.

Witnesses
Inventor
Max Julius Emanuel Thorer
by his Attorney

UNITED STATES PATENT OFFICE.

MAX JULIUS EMANUEL THORER, OF LEUTZSCH, NEAR LEIPSIC, GERMANY.

ANIMAL-TRAP.

No. 835,874.   Specification of Letters Patent.   Patented Nov. 13, 1906.

Application filed August 3, 1906. Serial No. 328,991.

*To all whom it may concern:*

Be it known that I, MAX JULIUS EMANUEL THORER, gentleman, a subject of the German Emperor, residing at Leutzsch, near Leipsic, in the Empire of Germany, have invented certain new and useful Improvements in Animal-Traps, of which the following is a specification.

This invention relates to an improved animal-trap, more especially a vermin or rodent trap, adapted to successively admit a plurality of animals and to be automatically adjusted after each admittance in such a manner that the return path or exit is closed by a door or shutter operated by a falling platform. The novel feature of the invention substantially consists in the construction whereby the falling platform remains perfectly stationary until the animal has passed the door or shutter, but that as soon as the animal has passed beyond the said door the platform immediately descends and the door closes. The animal is therefore not warned of danger in time to afford it any possibility of retreat.

In traps of a similar type hitherto known the trap projects to a considerable extent beyond the pivotal axis of the platform, so that when an animal steps onto the platform the latter begins to rock, and thus conveys a warning which may cause the animal to withdraw or to hesitate, and thus be caught between the door and the roof of the chamber.

In some known constructions the arrangement of the chamber or cage in which the trapped animals are retained behind the chamber in which the actual trapping takes place involves the provision of two platforms adapted to swing downward at the center of the latter chamber. It has been found that with this arrangement an animal sometimes closes the inner shutter by stepping on the prolongation of the rearward platform, and thus reopens the outer shutter and is enabled to regain its freedom by means of a leap.

In the present invention the shutter terminates directly in front of the pivotal axis of the falling platform, and the cage is arranged below the trap-chamber, so that the platform can be made in one piece equal in length to the said chamber. When, therefore, the animal passes the pivotal axis of the platform, the latter immediately swings downward without preliminary rocking, and the platform remains depressed until the animal falls off, whereupon the trap is automatically reset.

The trap mechanism is independent of the size of the cage and can be connected to the hinged cover of a cage of any dimension, so that the device is not only suitable for catching small rodents and the like, but also for trapping larger wild animals. The manner in which the cage is arranged allows of readily and safely removing the trapped animals without at the same time removing the trap. This is an important advantage, more particularly in the case of dangerous beasts of prey.

The invention is illustrated in the annexed drawings, in which—

Figure 2:
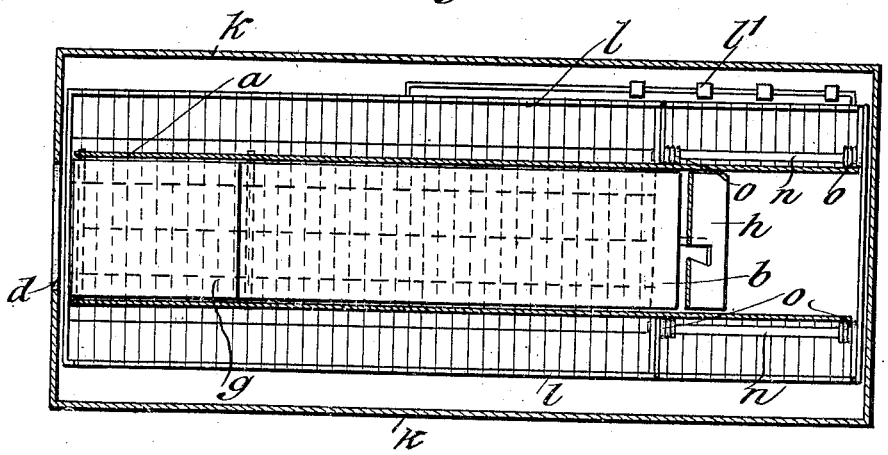
Figure 3:
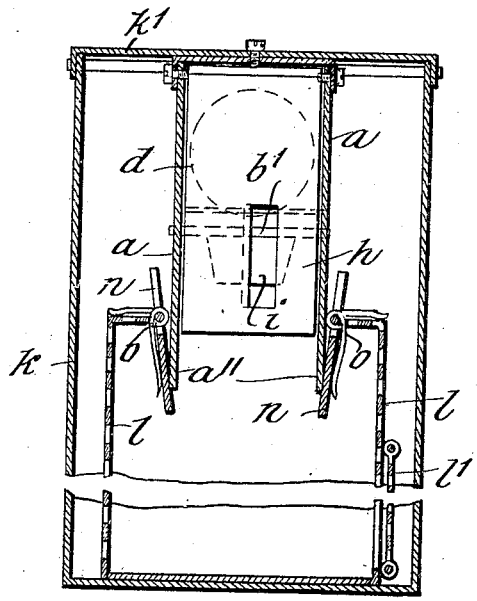
Figure 4:
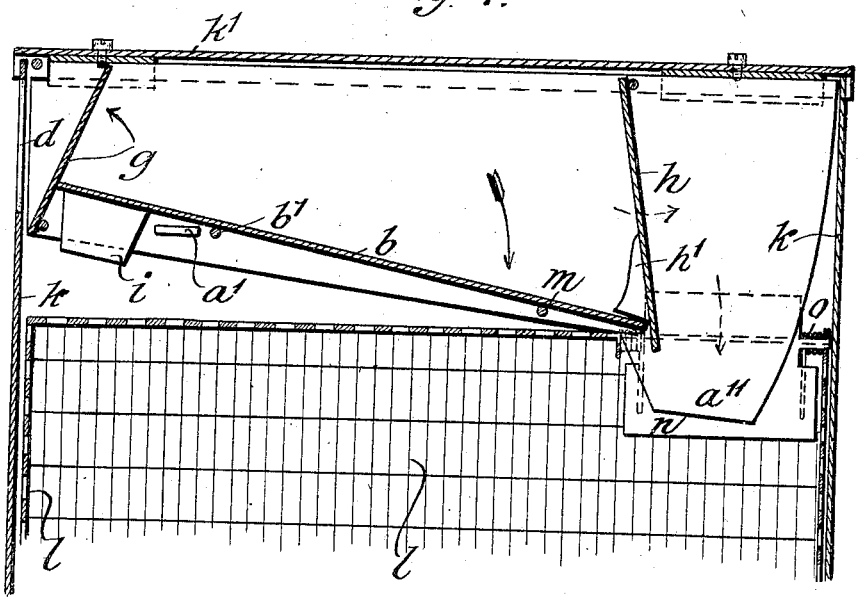

Figure 1 is a longitudinal section of the set trap; Fig. 2, a plan view, and Fig. 3 a cross-section. Fig. 4 is a longitudinal section of the closed trap with the cage open, and Figs. 5 and 6 are respectively a longitudinal section and a cross-section representing the trap with the cover open and the cage closed.

The trap mechanism comprises two side walls $a$ and a platform $b$, which is made in one piece and rotatable on pivots $b'$, having bearing in said side walls. When the trap is set, this platform $b$ is horizontal and rests on a support $a'$ and is thus in part located in the known manner underneath a hinged door $g$, adapted to close the inlet-aperture $d$. In the present invention the arrangement is such that the door $g$ when open does not project beyond the pivots $b'$. Near the end opposite the entrance $d$ a plate $h$ is so suspended that it bears against one edge of the platform $b$ and closes the trap-chamber at the rear. When the platform $b$ has fallen, a dog $h'$, fixed to the plate $h$, projects over the edge of platform $b$, and thus locks it in the known manner until the trap is automatically reset. The trap mechanism is connected to the hinged cover $k'$ of a box or cage $k$, and the latter contains a removable inner cage $l$, in which the trapped animals can be removed.

Figure 5:
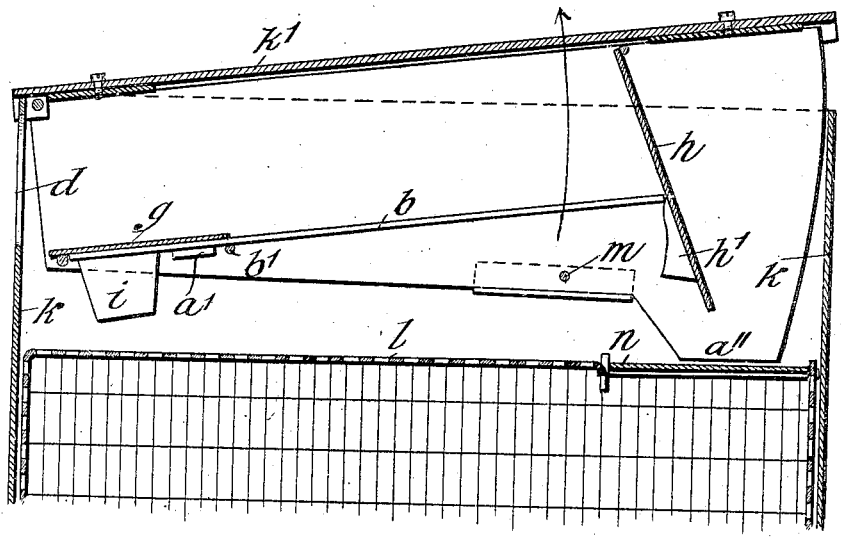
Figure 6:
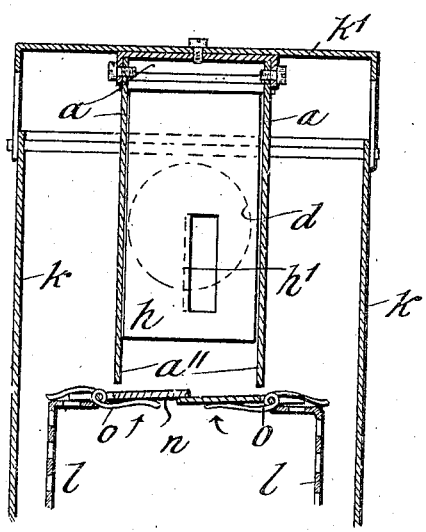

In order that the inner cage $l$ will be automatically closed when the box $k$ is opened, the cage $l$ is provided with two hinged shutters $n$, which are normally closed by springs $o$, Figs. 5 and 6, but which are swung inward by two downwardly-extended parts $a''$ of the walls $a$ of the trap-chamber when the box $k$ is closed. The cage $l$ is also provided with a suitable door $l'$ for the removal of the trapped animals.

When the hind legs of an animal entering the trap have passed the pivots $b'$, the platform $b$ is immediately swung downward by gravity, the plate $h$ being thus swung to the rear until the platform comes into contact with a support $m$, whereupon the plate $h$ swings forward and locks the platform by means of the cam $h'$, Fig. 4. Simultaneously the front part of the platform closes the aperture $d$ by raising the door $g$, so that the animal's retreat is cut off. Even if the animal succeeds in crawling up the inclined platform to the entrance, the trap remains closed.

The trap is not reopened until the animal pushes against the freely-suspended plate $h$ and by displacing the latter falls into the cage $l$. The displacement of the plate $h$ causes the platform to be released, so that it can return to its normal position under action of a weight $i$, fixed to its front part, the entrance $d$ being at the same time opened by the inward and downward movement of the shutter $g$. By this means the trap is reset.

What I claim as my invention, and desire to secure by Letters Patent of the United States, is—

1. An animal-trap comprising in combination a chamber, a pivoted platform therein, an entrance-door hinged at its lower end adjacent to one end of the platform and a door pivoted at its upper end adjacent to the other end of said platform having a dog adapted to engage the platform, the pivotal axis of the platform being so placed intermediate of its ends that the entrance-door when folded onto the platform extends to said pivotal axis.

2. An animal-trap comprising in combination a chamber, a lid thereto, two side walls within the chamber attached to the lid thereof, a pivoted platform therein, an entrance-door hinged at its lower end adjacent to one end of the platform and a door pivoted at its upper end adjacent to the other end of said platform having a dog adapted to engage the platform, the pivotal axis of the platform being so placed intermediate of its ends that the entrance-door when folded onto the platform extends to said pivotal axis.

3. An animal-trap comprising in combination a chamber, a pivoted platform therein, an entrance-door hinged at its lower end adjacent to one end of the platform and a door pivoted at its upper end adjacent to the other end of said platform having a dog adapted to engage the platform, the pivotal axis of the platform being so placed intermediate of its ends that the entrance-door when folded onto the platform extends to said pivotal axis, an interior removable cage in said chamber having a door with automatically-closing shutters, and means in said chamber for holding said shutters open while the chamber is closed.

In witness whereof I have signed this specification in the presence of two witnesses.

MAX JULIUS EMANUEL THORER.

Witnesses:
HERM. TACK,
RUDOLPH FRICKE.